(12) United States Patent
Kustowski et al.

(10) Patent No.: US 9,612,351 B2
(45) Date of Patent: Apr. 4, 2017

(54) SYSTEM AND METHOD FOR ESTIMATING AND ATTENUATING NOISE IN SEISMIC DATA

(75) Inventors: Bogdan Kustowski, Walnut Creek, CA (US); Gilles Hennenfent, San Ramon, CA (US); Jeffrey Cole, Danville, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 736 days.

(21) Appl. No.: 13/545,467

(22) Filed: Jul. 10, 2012

(65) Prior Publication Data
US 2014/0019055 A1 Jan. 16, 2014

(51) Int. Cl.
*G01V 1/28* (2006.01)
*G01V 1/36* (2006.01)

(52) U.S. Cl.
CPC ............... *G01V 1/364* (2013.01); *G01V 1/28* (2013.01); *G01V 2210/32* (2013.01)

(58) Field of Classification Search
CPC . G01V 1/00; G01V 1/005; G01V 1/28; G01V 1/30; G01V 1/32; G01V 1/364; G01V 2210/20; G01V 2210/23; G01V 2210/32; G01V 2210/34; G01V 2210/36; G01V 2210/38; G01V 2210/40; G01V 2210/50; G01V 2210/60; G01V 2210/70;
(Continued)

(56) References Cited

U.S. PATENT DOCUMENTS

| 4,568,829 A * | 2/1986 | Ruckebusch ............ G01V 5/06 250/256 |
| 5,392,255 A * | 2/1995 | LeBras et al. ................. 367/50 |

(Continued)

FOREIGN PATENT DOCUMENTS

| CN | 101620276 A | 6/2009 |
| CN | 102141634 A | 1/2011 |

(Continued)

OTHER PUBLICATIONS

Gilles Hannenfent and Felix Herrmann; "Seismic Denoising with Nonuniformly Sampled Curvelets" May/Jun. 2006, Institute of Electrical and Electronics Engineers, Inc, vol. 8, Issue 3, pp. 16-25.*

(Continued)

*Primary Examiner* — Mischita Henson
*Assistant Examiner* — Christine Liao
(74) *Attorney, Agent, or Firm* — Marie L. Clapp

(57) ABSTRACT

A system and method for attenuating noise in seismic data representative of a subsurface region of interest including receiving the seismic data; transforming the seismic data into a domain wherein the seismic data have a sparse or compressible representation to create transformed seismic data; dividing the domain into windows wherein the windows represent known spatio-temporal locations in the seismic data; determining statistics of the transformed seismic data in each window; determining a filter for each window based on the statistics of the transformed data; applying the filter for each window to the transformed seismic data in each window to create filtered seismic data; and performing (Continued)

an inverse transform of the filtered seismic data to create noise-attenuated seismic data.

19 Claims, 7 Drawing Sheets

(58) Field of Classification Search
CPC ..... G01V 2210/324; G01V 2210/3246; G01V 2210/665
USPC ...... 702/14, 17; 367/73, 74; 382/109; 703/2, 703/10
See application file for complete search history.

(56) References Cited

U.S. PATENT DOCUMENTS

| | | | | |
|---|---|---|---|---|
| 5,850,622 | A * | 12/1998 | Vassiliou et al. | ............... 702/17 |
| 7,671,717 | B2 * | 3/2010 | Zhang | ................... G08B 17/06 169/60 |
| 7,672,717 | B1 * | 3/2010 | Zikov | ................ A61B 5/0476 600/509 |
| 7,944,974 | B2 | 5/2011 | Bernard et al. | |
| 8,010,293 | B1 | 8/2011 | Peng et al. | |
| 2004/0054479 | A1 * | 3/2004 | Trickett | ................... G01V 1/36 702/14 |
| 2006/0190181 | A1 * | 8/2006 | Deffenbaugh et al. | ......... 702/14 |
| 2008/0033655 | A1 * | 2/2008 | Ozbek et al. | ................... 702/17 |
| 2010/0097888 | A1 | 4/2010 | Neelamani et al. | |
| 2010/0186950 | A1 | 7/2010 | Neelamani et al. | |
| 2010/0212909 | A1 | 8/2010 | Baumstein et al. | |
| 2011/0147004 | A1 | 6/2011 | Neelamani et al. | |

FOREIGN PATENT DOCUMENTS

| | | |
|---|---|---|
| EP | 2141514 A2 | 6/2009 |
| WO | WO02/095449 | 11/2002 |

OTHER PUBLICATIONS

Gilles Hennenfent et al., Seismic Denoising with Nonuniformly Sampled Curvelets, Institute of Electrical and Electronics Engineers, vol. 8, Issue 3, pp. 16-25, Jun. 2006.

Yang, Liu et al., A 1D time-varying median filter for seismic random, spike-like noise elimination, Geophysics, Society of Exploration Geophysicists, US. vol. 74, No. 1, pp. V17-V24, Jan. 1, 2009.

Weishi M., et al, "Statistical denoising of signals in the S-transform domain", Computers and Geosciences, Pergamon Press, Oxford, GB, vol. 35, No. 7, pp. 1079-1086, 2009.

* cited by examiner

SYSTEM AND METHOD FOR ESTIMATING AND ATTENUATING NOISE IN SEISMIC DATA

FIELD OF THE INVENTION

The present invention relates generally to methods and systems for estimating and attenuating noise in seismic data and, in particular, methods and systems for estimating and attenuating noise in seismic data which allow spatial and temporal variation to accommodate variable noise levels.

BACKGROUND OF THE INVENTION

Exploration and development of hydrocarbon reservoirs may be efficiently done with the help of seismic data, which must be properly processed in order to allow interpretation of subsurface features. In practice, seismic data is often contaminated by noise which may be coherent or incoherent (e.g. random) in nature. In addition, the noise level may vary both spatially and temporally.

Conventional noise suppression methods often have difficulty estimating and removing spatially and temporally varying noise. Conventional methods may try to normalize the amplitudes across the seismic data prior to the attenuation step, often using an algorithm like Automatic Gain Control (AGC). This may lead to erroneous suppression of signal in areas with strong signal and weak noise.

Efficient and effective methods for estimating and attenuating spatially and temporally varying noise in seismic data are needed to improve the final seismic image and allow proper interpretation of the subsurface features.

SUMMARY OF THE INVENTION

Described herein are implementations of various approaches for a computer-implemented method for noise estimation and attenuation in seismic data.

A computer-implemented method for attenuating noise in seismic data representative of a subsurface region of interest is disclosed. The method includes receiving the seismic data; transforming the seismic data into a domain wherein the seismic data have a sparse or compressible representation to create transformed seismic data; dividing the domain into windows wherein the windows represent known spatio-temporal locations in the seismic data; determining statistics of the transformed seismic data in each window; determining a filter for each window based on the statistics of the transformed data; applying the filter for each window to the transformed seismic data in each window to create filtered transformed seismic data; and performing an inverse transform of the filtered transformed seismic data to create filtered seismic data.

In one embodiment, the domain may be a curvelet domain. In another embodiment, the domain may be a wavelet domain.

In an embodiment, the filter may be a threshold.

In one embodiment the filtered seismic data is noise-attenuated seismic data.

In another embodiment, the filtered seismic data is a noise model which may then be subtracted from the seismic data to create noise-attenuated seismic data.

In another embodiment, a computer system including a data source or storage device, at least one computer processor and a user interface is used to implement the method for attenuating noise in the seismic data is disclosed.

In yet another embodiment, an article of manufacture including a computer readable medium having computer readable code on it, the computer readable code being configured to implement a method for attenuating noise in seismic data representative of a subsurface region of interest is disclosed.

The above summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

These and other features of the present invention will become better understood with regard to the following description, claims and accompanying drawings where:

DETAILED DESCRIPTION OF THE INVENTION

Figure 1:
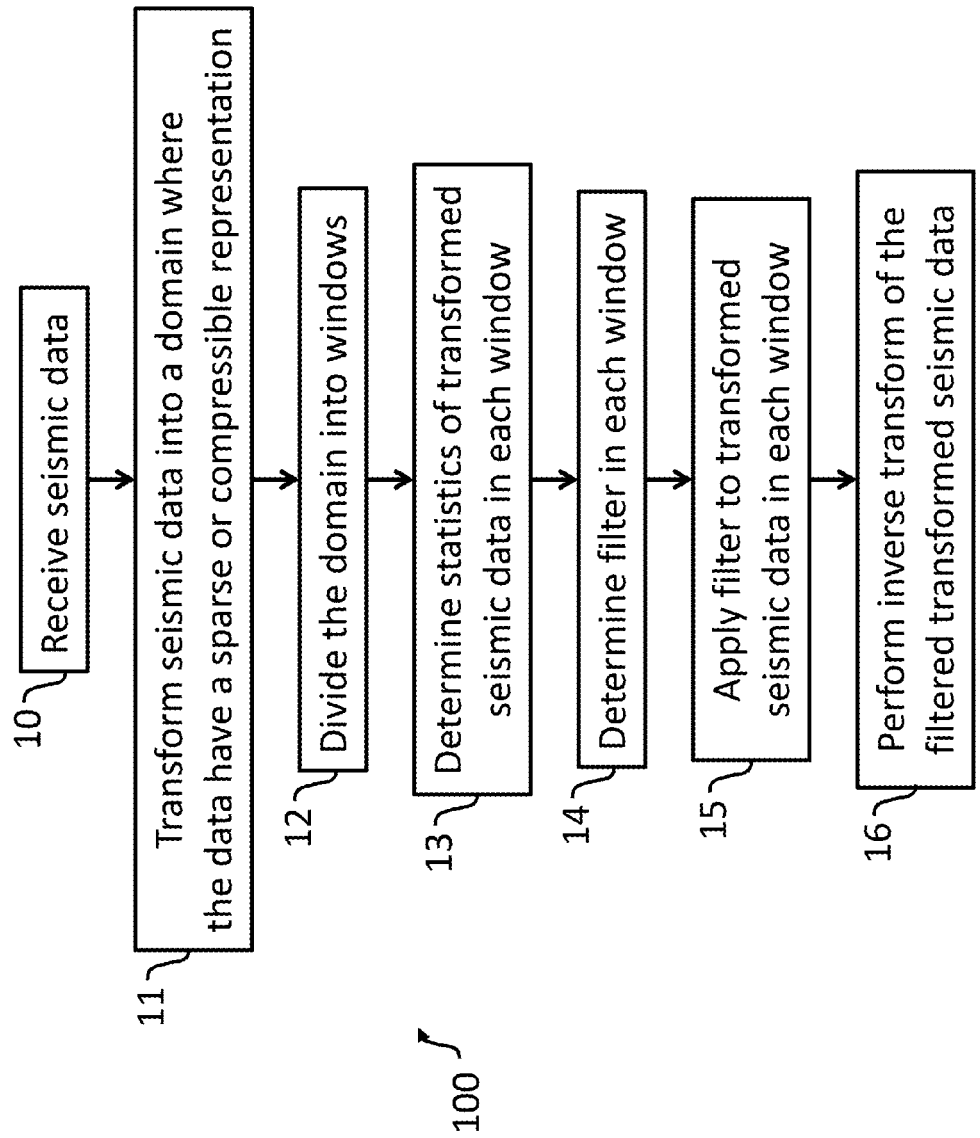
FIG. 1 is a flowchart illustrating a method in accordance with an embodiment of the present invention.

The present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Moreover, those skilled in the art will appreciate that the present invention may be practiced using any one or combination of hardware and software configurations, including but not limited to a system having single and/or multiple processor computers, hand-held devices, programmable consumer electronics, mini-computers, mainframe computers, and the like. The invention may also be practiced in distributed computing environments where tasks are performed by servers or other processing devices that are linked through a one or more data communications network. In a distributed computing environment, program modules may be located in both local and remote computer storage media including memory storage devices. The present invention may also be practiced as part of a down-hole sensor or measuring device or as part of a laboratory measuring device.

Also, an article of manufacture for use with a computer processor, such as a CD, pre-recorded disk or other equivalent devices, may include a computer program storage medium and program means recorded thereon for directing the computer processor to facilitate the implementation and practice of the present invention. Such devices and articles of manufacture also fall within the spirit and scope of the present invention.

Referring now to the drawings, embodiments of the present invention will be described. The invention can be implemented in numerous ways, including, for example, as a system (including a computer processing system), a method (including a computer implemented method), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

The present invention relates to estimating and attenuating noise in seismic data. One embodiment of the present invention is shown as method 100 in FIG. 1. In this embodiment, seismic data is received 10. The seismic data may be, by way of example and not limitation, from seismic surveys on land, marine seismic surveys or synthetic seismic data. The seismic data may be 1D data, 2D data, 2.5D data, 3D data and/or time lapse or 4D data.

The seismic data is transformed at 11 into a domain in which the transformed data have a sparse or compressible representation. In such a domain, the signal is represented by a relatively small number of significant coefficients, while the random noise is represented by a large number of small-valued or zero-valued coefficients. Examples of such domains include wavelet domains and curvelet domains.

Figure 2:
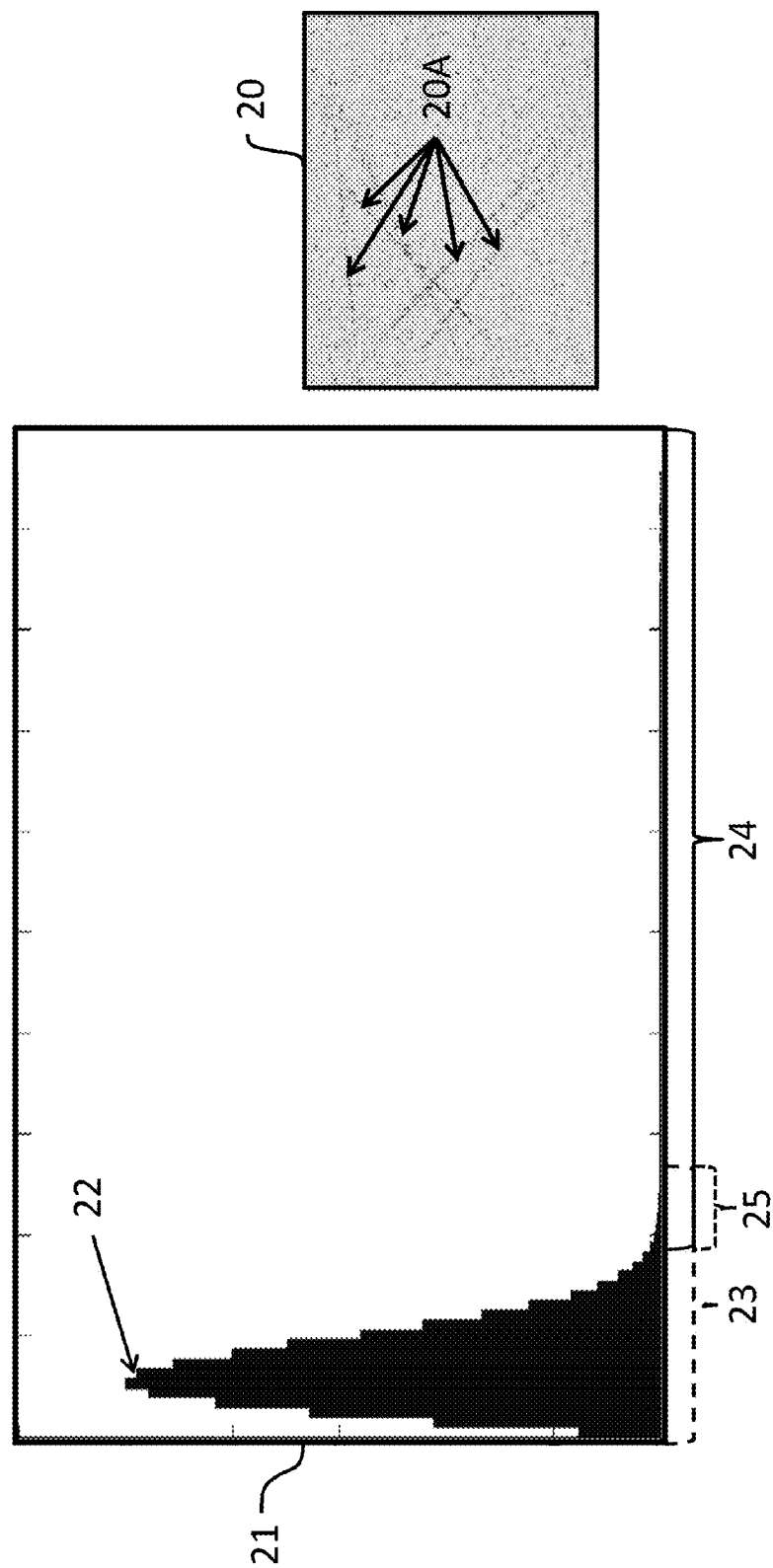
FIG. 2 shows a noisy synthetic seismic dataset and a histogram of the curvelet coefficients for the dataset.

FIG. 2 includes an example of noisy synthetic data 20. The data includes 5 linear events 20A and is full of random noise. After transformation into the curvelet domain, a histogram 21 may be created that represents the curvelet coefficients of the transformed data. The approximate median value of curvelet coefficients is indicated 22. In this case, one skilled in the art would be able to tell that the median value is representative of the noise 23 which has a large number of small coefficients while the remainder of the histogram is representative of the signal 24 with barely perceptible numbers of large coefficients. There is some overlap 25 of the noise and signal.

Figure 3:
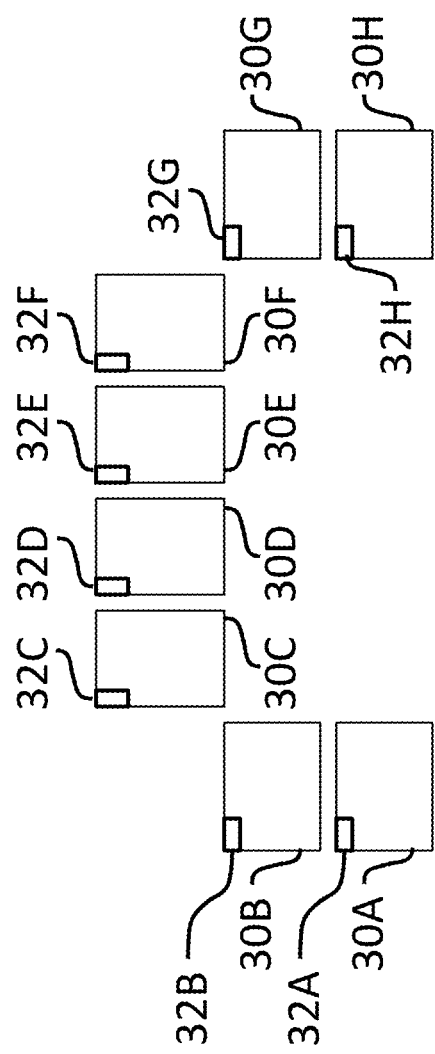
FIG. 3 is a representation of windows in a sparse or compressible domain.

The domain into which the data is transformed is divided into windows 12. The nature of this division, such as the size and shape of the divided sections, depends on the domain and the distribution of the transformed data. For example, if the domain is a curvelet domain, the division may be into windows in each angular wedge at each scale. Each scale represents a bandpass-filtered version of the data and each angular wedge within a scale corresponds to the finite range of dips. This is demonstrated in FIG. 3 which illustrates eight angular wedges, 30A-30H, for a single scale. A window, 32A-32H, representing the same, or approximately the same, spatio-temporal location is shown in each wedge.

Once the domain has been divided, the statistics of the transformed seismic data for each window in all angular wedges at a particular scale may be determined 13. These statistics may include, for example, a median or other quantile of the transformed data. The statistics for the windows will be similar to that seen for the overall dataset, as seen in FIG. 2, meaning that a value such as the median may be indicative of the noise. The statistics for each window may be calculated for each scale.

Once the statistics of the transformed data in each window are determined at step 13 of method 100, it is possible to determine a filter based on those statistics at step 14 of method 100. The filter may be a threshold. This filter can be used to separate the noise from the signal in the transformed seismic data in each window by applying the filter at step 15 of method 100. The filter may be different for each window of the domain, meaning that the filter can vary in both space and time. After each window has had its filter applied, the filtered data is inverse transformed back into the original domain at step 16. The filter can be designed to suppress either the noise or the signal which means that the inverse transform may produce a signal model or a noise model, respectively.

Figure 4A:
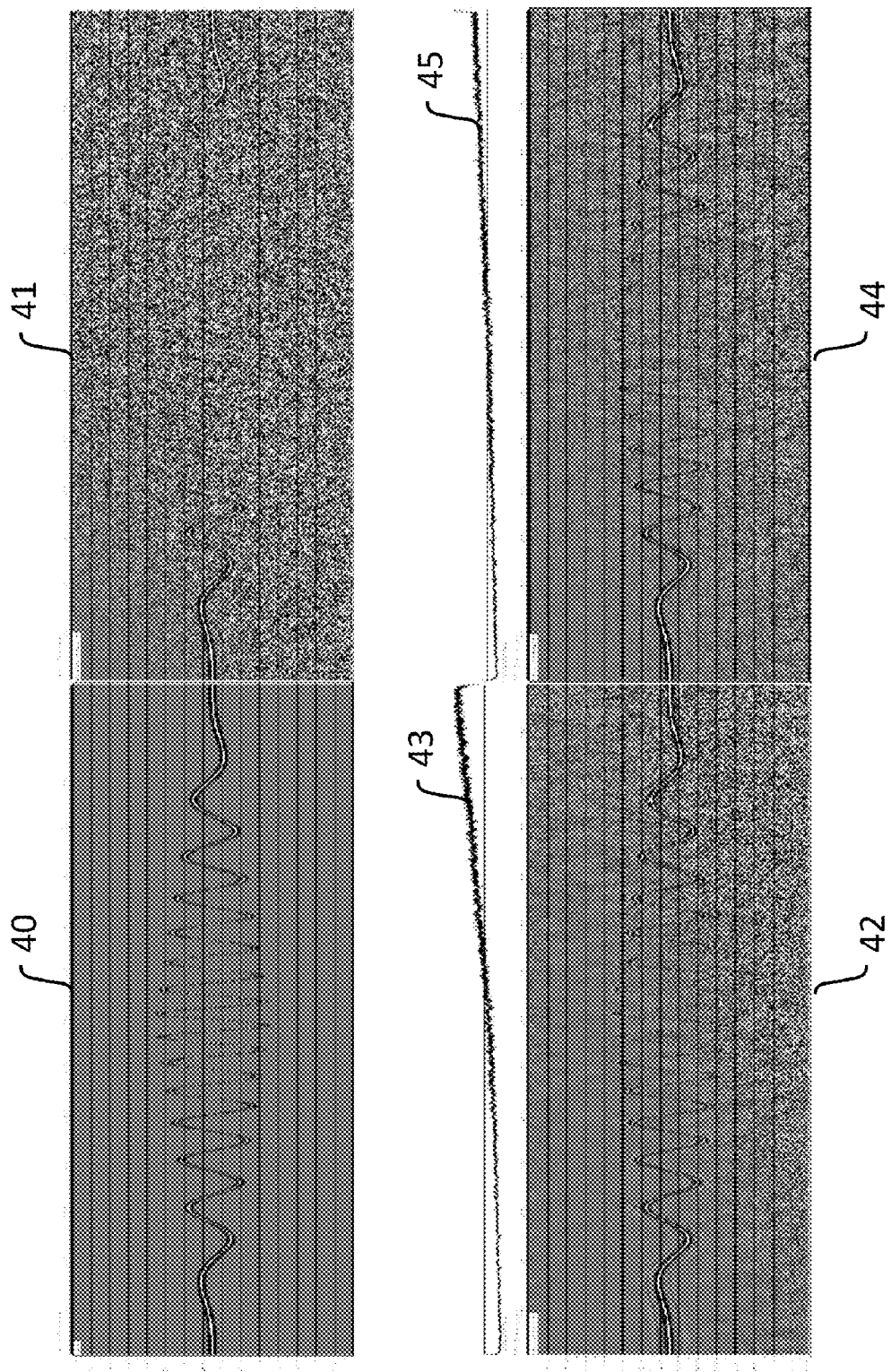
FIG. 4A uses synthetic data to compare the result of an embodiment of the present invention with a conventional method.
Figure 4B:
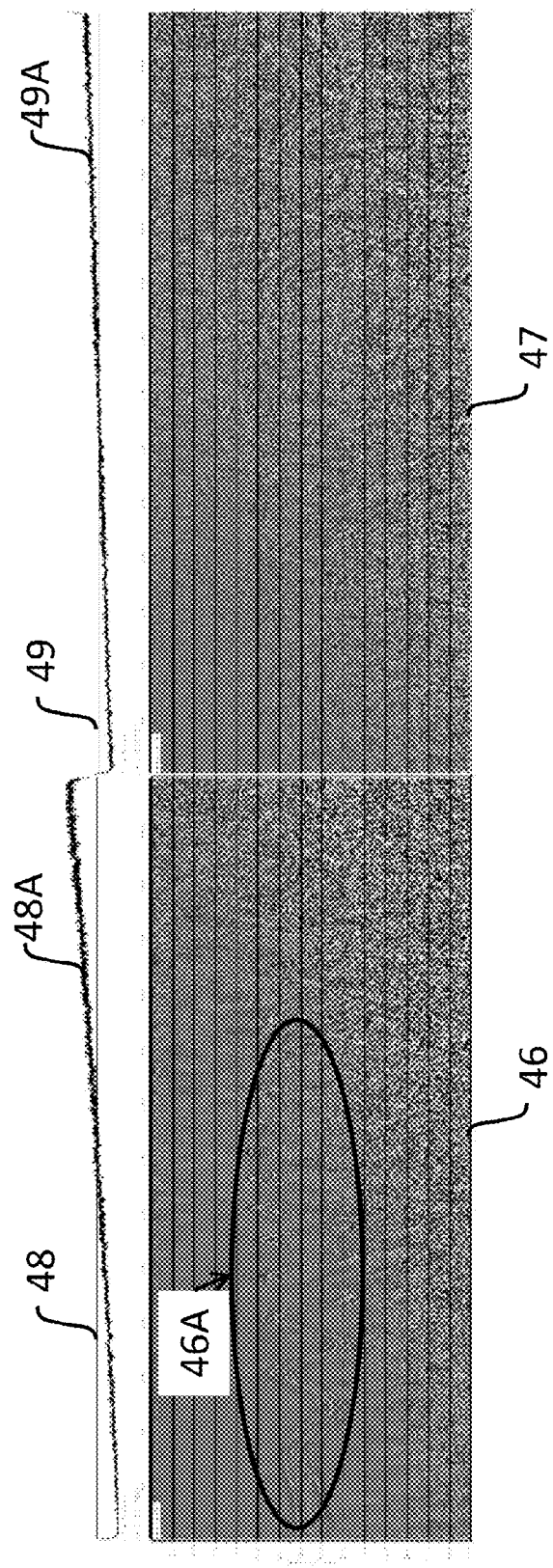
FIG. 4B compares the error in the result of an embodiment of the present invention with the error in the result of the conventional method.

The result of method 100 may be seen in FIG. 4A. Here, the pure signal is shown as a single sinusoidal signal 40. The signal has been combined with random noise that is relatively weak in the upper left corner and increases in strength to the lower right to create a synthetic input dataset 41. A conventional noise attenuation method that uses a constant threshold across space and time was applied to the input dataset 41 to generate the conventional output 42. The method 100 implemented with a threshold that varies in space and time has been used to isolate and suppress the noise to generate the new output 44. Lines 43 and 45 indicate the RMS amplitude for each trace of 42 and 44, respectively. Both the conventional noise attenuation method and method 100 were parameterized to remove, on average, the same amount of energy from the entire ensemble of traces. FIG. 4B shows the error in the results; the difference between the result of the conventional method 42 and the pure signal 40 is seen at 46 and the difference between the result of an embodiment of the present invention 44 and the pure signal 40 is at 47. Since the conventional method does not vary its suppression in time and space, it has removed more signal 46A than the embodiment of method 100 resulting in 44. The conventional method also shows slightly higher average error than the embodiment of method 100, as shown by line 48 which shows the average RMS level of the conventional error 46 and line 49 which shows the average RMS level of the error in the result from the present invention. The RMS amplitude for each trace of the errors is shown as line 48A for the conventional method error 46 and as line 49A for the error in the result of present invention 47.

Figure 5:
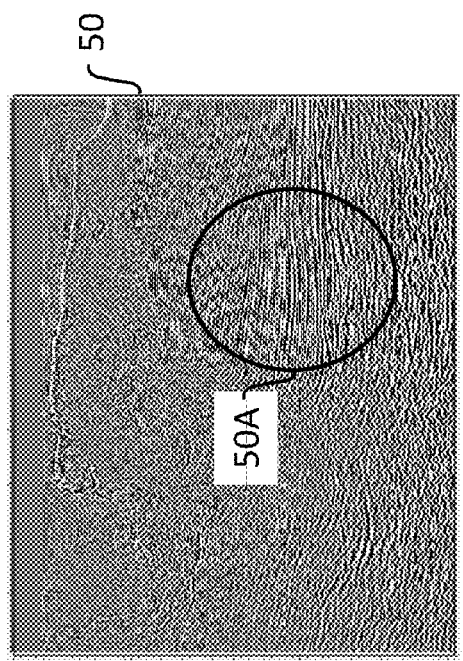
FIG. 5 uses real seismic data to compare the result of an embodiment of the present invention with a conventional method.
Figure 5:
Figure 5:
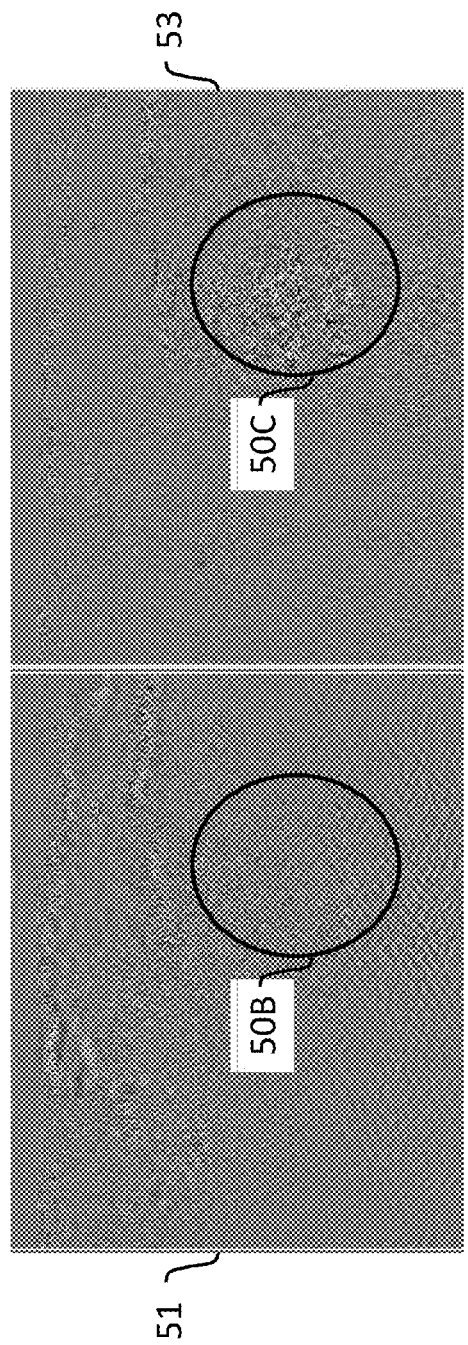

FIG. 5 compares the result of method 100 with a conventional noise-suppression method on real seismic data. The seismic data 50 contains spatially and temporally varying noise and has several events and regions of strong signal and weak noise, including area 50A. The seismic data 50 was input to the method 100 of FIG. 1. The noise removed using method 100 is shown in 51 of FIG. 5. The seismic data 50 was also input to a conventional noise-suppression method using Automatic Gain Control (AGC) to normalize the amplitudes across the seismic data prior to the attempted noise suppression. The noise removed by a conventional method using a constant threshold across all traces may be seen in 53 of FIG. 5. Strong signal region 50A is indicated in 51 and 53 as regions 50B and 50C, respectively. There is considerably more "noise" energy in 53, which is actually part of the strong signal which has been erroneously considered noise by the conventional method. The AGC normalization scalars, which dictate how strong the noise attenuation is in the conventional method are derived from the sum of signal and noise. This has led to overly aggressive noise attenuation in region 50C of 53 since the signal is strong in 50A. On the other hand, the present invention shows little sensitivity to the presence of signal (strong reflectors), estimated noise is weak, effective thresholds are small, and the strong reflectors are not damaged as seen in region 50B of 51.

The energy of the noise in FIG. 5 is also seen as line 52 for the present invention and line 54 for the conventional method. This also shows that the "noise" removed by the conventional method is higher across region 50B. However, the average energy of the noise removed by both methods is the same as indicated by lines 55.

Figure 6:
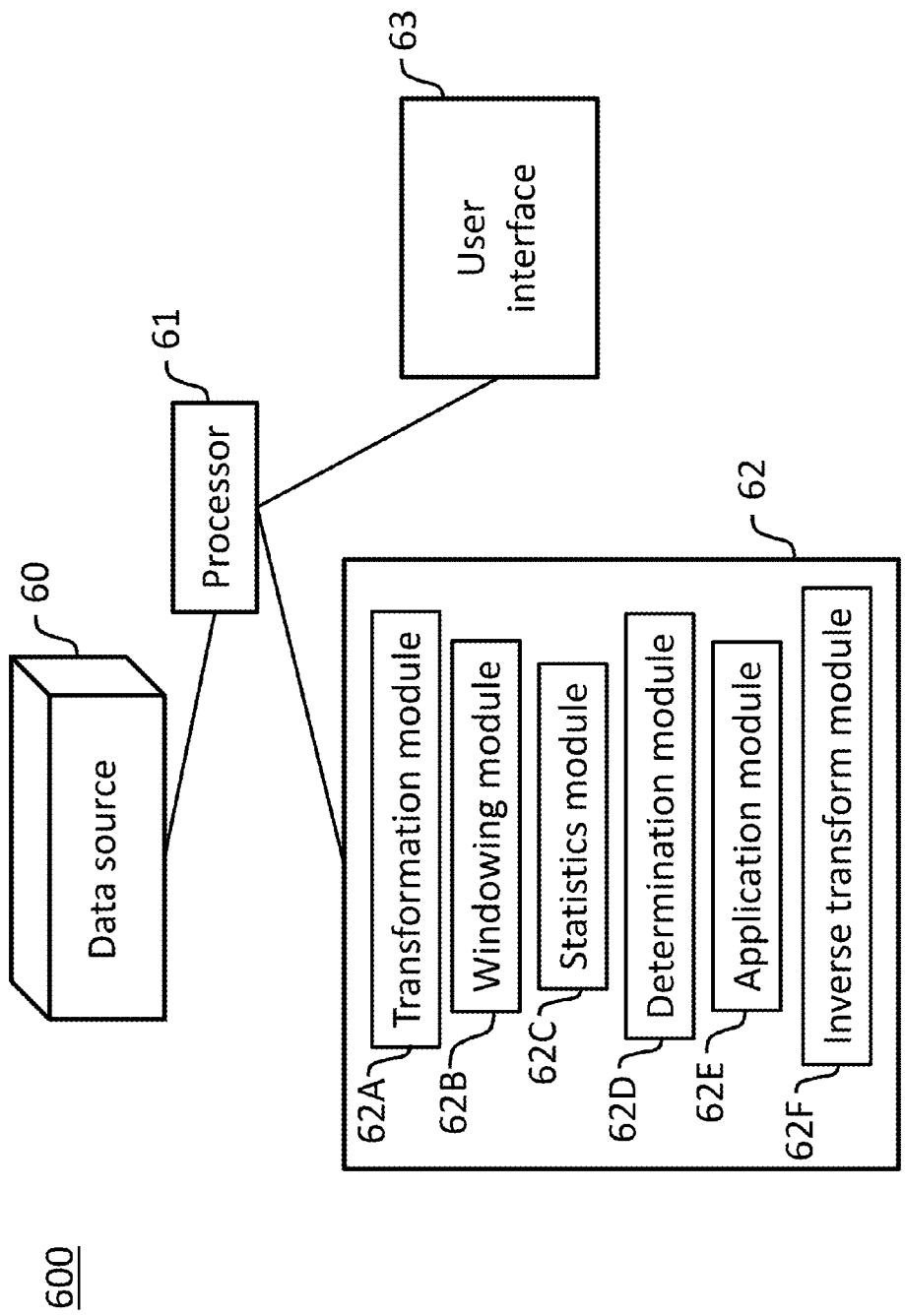
FIG. 6 schematically illustrates a system for performing a method in accordance with an embodiment of the invention.

A system 600 for performing the method 100 of FIG. 1 is schematically illustrated in FIG. 6. The system includes a data source/storage device 60 which may include, among others, a data storage device or computer memory. The device 60 may contain recorded seismic data and/or synthetic seismic data. The data from device 60 may be made available to a processor 61, such as a programmable general purpose computer. The processor 61 is configured to execute computer modules 62 that implement method 100. These computer modules may include a transformation module 62A to perform step 11 of method 100, a windowing module 62B to perform step 12, a statistics module 62C to perform step 13, a determination module 62D to perform step 14, an application module 62E to perform step 15 and an inverse transform module 62F to perform step 16. The system may include interface components such as user interface 63. The user interface 63 may be used both to display data and processed data products and to allow the user to select among options for implementing aspects of the method. By way of example and not limitation, the noise-attenuated seismic data and removed noise computed on the processor 61 may be displayed on the user interface 63, stored on the data storage device or memory 60, or both displayed and stored.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention. In addition, it should be appreciated that structural features or method steps shown or described in any one embodiment herein can be used in other embodiments as well.

What is claimed is:

1. A computer-implemented method for attenuating incoherent noise in seismic data representative of a subsurface region of interest, the method comprising:
   a. receiving, at a computer processor, the seismic data which contains incoherent noise that varies spatially and temporally;
   b. transforming, via the computer processor, the seismic data into a domain wherein the seismic data have a sparse or compressible representation and the incoherent noise is represented by a peak in a histogram of coefficients to create transformed seismic data;
   c. dividing the domain into windows wherein the windows represent known spatio-temporal locations that are a subset of spatial and temporal locations in the seismic data;
   d. determining, via the computer processor, statistics of the transformed seismic data to define a noise level in each window;
   e. determining, via the computer processor, a filter for each window based on the statistics of the transformed data;
   f. applying, via the computer processor, the filter for each window to the transformed seismic data in each window to create filtered transformed seismic data that accounts for spatial and temporal variation in strength of signal and noise in the seismic data;
   g. performing, via the computer processor, an inverse transform of the filtered seismic data to create filtered seismic data; and
   h. processing the filtered seismic data to allow interpretation of subsurface features for exploration and development of hydrocarbon reservoirs.

2. The method of claim 1 wherein the domain is a curvelet domain.

3. The method of claim 2 wherein the dividing the domain into windows is accomplished by subdividing each angular wedge at each scale into the windows representative of the spatio-temporal locations.

4. The method of claim 1 wherein the domain is a wavelet domain.

5. The method of claim 1 wherein the statistics of the transformed data are medians.

6. The method of claim 1 wherein the filter is a threshold.

7. The method of claim 1 wherein the filtered seismic data is noise-attenuated seismic data.

8. The method of claim 1 wherein the filtered seismic data is a noise model.

9. The method of claim 8 further comprising subtracting the noise model from the seismic data to create noise-attenuated seismic data.

10. A system for attenuating incoherent noise in seismic data representative of a subsurface region of interest, the system comprising:
    a. a data source containing seismic data which contains incoherent noise that varies spatially and temporally representative of the subsurface region of interest;
    b. a computer processor configured to execute computer modules, the computer modules comprising:
       i. a transformation module for transforming the seismic data into a domain wherein the seismic data have a sparse representation and the incoherent noise is represented by a peak in a histogram of coefficients to create transformed seismic data;
       ii. a windowing module for dividing the domain into windows that are a subset of spatial and temporal locations;
       iii. a statistics module for determining statistics to define a noise level in each window;
       iv. a determination module for determining a filter in each window;
       v. an application module for applying the filter to the transformed seismic data to create filtered transformed seismic data that accounts for spatial and temporal variation in strength of signal and noise in the seismic data; and
       vi. an inverse transformation module to transform the filtered transformed seismic data into filtered seismic data; and
       vii, a hydrocarbon reservoir module to process and interpret the filtered seismic data to identify and develop hydrocarbon reservoirs; and
    c. an user interface.

11. The system of claim 10 wherein the domain is a curvelet domain.

12. The system of claim 11 wherein the dividing the domain into windows is accomplished by subdividing each angular wedge at each scale into windows representative of spatio-temporal locations.

13. The system of claim 10 wherein the domain is a wavelet domain.

14. The system of claim 10 wherein the statistics of the transformed data are medians.

15. The system of claim 10 wherein the filter is a threshold.

16. The system of claim 10 wherein the filtered seismic data is noise-a attenuated seismic data.

17. The system of claim 10 wherein the filtered seismic data is a noise model.

18. The system of claim 17 wherein the computer modules further comprise a subtraction module for subtracting the noise model from the seismic data to create noise-attenuated seismic data.

19. An article of manufacture including a computer readable medium having computer readable code on it, the computer readable code being configured to implement a method for attenuating incoherent noise that varies spatially and temporally in seismic data representative of a subsurface region of interest, the method comprising:

a. transforming the seismic data into a domain wherein the seismic data have a sparse or compressible representation and the incoherent noise is represented by a peak in a histogram of coefficients to create transformed seismic data;

b. dividing the domain into windows wherein the windows represent known spatio-temporal locations that are a subset of spatial and temporal locations in the seismic data;

c. determining statistics of the transformed seismic data to define a noise level in each window;

d. determining a filter for each window based on the statistics of the transformed data;

e. applying the filter for each window to the transformed seismic data in each window to create filtered transformed seismic data that accounts for spatial and temporal variation in strength of signal and noise in the seismic data;

f. performing an inverse transform of the filtered transformed seismic data to create filtered seismic data; and g. processing the filtered seismic data to allow interpretation of subsurface features for exploration and development of hydrocarbon reservoirs.

* * * * *